(12) United States Patent
Barna

(10) Patent No.: US 8,690,595 B2
(45) Date of Patent: Apr. 8, 2014

(54) SQUID CONNECTOR WITH COUPLING FEATURE

(75) Inventor: Kyle Steven Barna, Syracuse, NY (US)

(73) Assignee: Cooper Technologies Company, Houston, TX (US)

( * ) Notice: Subject to any disclaimer, the term of this patent is extended or adjusted under 35 U.S.C. 154(b) by 131 days.

(21) Appl. No.: 13/532,572

(22) Filed: Jun. 25, 2012

(65) Prior Publication Data

US 2013/0344727 A1    Dec. 26, 2013

(51) Int. Cl.
*H01R 13/627* (2006.01)

(52) U.S. Cl.
USPC ..................... 439/352; 439/620.26

(58) Field of Classification Search
CPC ............................. H01R 13/68; H01R 13/6272
USPC ............ 439/352, 484, 620.26, 620.28, 620.3,
439/620.34, 339
See application file for complete search history.

(56) References Cited

U.S. PATENT DOCUMENTS

| | | | |
|---|---|---|---|
| 3,518,600 A | 6/1970 | Urani | |
| 4,408,816 A | 10/1983 | Knecht | |
| 4,477,801 A | 10/1984 | Robinson, Jr. et al. | |
| 4,648,670 A * | 3/1987 | Punako et al. | 439/321 |
| 4,696,527 A | 9/1987 | Ding et al. | |
| 5,203,720 A | 4/1993 | Zini | |
| 5,209,670 A | 5/1993 | Meurer | |
| 6,213,815 B1 | 4/2001 | Wu | |
| 6,297,730 B1 | 10/2001 | Dickinson | |
| 6,688,776 B2 | 2/2004 | Simmons et al. | |
| 6,907,615 B1 | 6/2005 | Alexander et al. | |
| 7,270,568 B2 | 9/2007 | Osypka | |
| 7,370,413 B2 | 5/2008 | Perle et al. | |
| 7,442,077 B2 | 10/2008 | Peress et al. | |
| 7,521,634 B2 | 4/2009 | Clem et al. | |
| 7,530,851 B2 | 5/2009 | Parnis | |
| 7,611,367 B2 | 11/2009 | Lee | |
| 7,713,089 B2 | 5/2010 | Faust et al. | |
| 7,955,134 B2 | 6/2011 | Donth et al. | |
| 8,052,481 B2 | 11/2011 | Azad et al. | |
| 8,095,713 B2 | 1/2012 | Minoo et al. | |
| 2009/0090551 A1 | 4/2009 | Cunningham et al. | |
| 2010/0230159 A1 | 9/2010 | Heo | |
| 2010/0291794 A1 | 11/2010 | Luo et al. | |
| 2011/0244704 A1 | 10/2011 | Trottier et al. | |
| 2013/0137289 A1 * | 5/2013 | Youn et al. | 439/352 |

* cited by examiner

*Primary Examiner* — Hae Moon Hyeon
(74) *Attorney, Agent, or Firm* — King & Spalding LLP

(57) ABSTRACT

A squid connector is described herein and can include a top portion and a bottom portion. The top portion can include a top housing having a top aperture and a top wall defining a top cavity. The top portion can also include a number of conductor receivers mechanically coupled to the top wall, and a top coupling feature disposed on the top housing. The bottom portion can include a bottom housing having a bottom aperture and a bottom wall defining a bottom cavity. The bottom portion can also include a number of fuse holders positioned within the bottom cavity, and a number of fuses removeably coupled to the fuse holders and a collector electrically coupled to the bottom end of the fuses. The bottom portion can also include a connector pin electrically coupled to the collector and a bottom coupling feature disposed on the bottom housing.

20 Claims, 4 Drawing Sheets

SQUID CONNECTOR WITH COUPLING FEATURE

TECHNICAL FIELD

The present disclosure relates generally to cable connectors and more particularly to systems, methods, and devices for a liquid-tight solar harness.

BACKGROUND

Solar harnesses are becoming increasingly common as the use of photovoltaic (PV) solar increases. In a PV solar application, signals (e.g., current, voltage) from a number of solar panels are fed individually into a single solar harness. Often, the solar harness includes a junction box or similar components. The solar harness integrates all of the individual signals from each of the solar panels into a single signal. Further, one or more protection schemes (e.g., ground fault, overcurrent) can be integrated into such a circuit.

Because of the number of connections required for such a circuit, installation can require a number of additional components (e.g., conduit, junction boxes) that add to the cost of installation, the time to install, the difficulty of installing, and the difficulty in maintaining and troubleshooting.

SUMMARY

In general, in one aspect, the disclosure relates to a squid connector. The squid connector can include a top portion and a bottom portion detachably coupled to the top portion. The top portion can include an upper top housing having a top aperture and an upper top wall defining an upper top cavity. The top portion can also include a number of conductor receivers mechanically coupled to an inner surface of the upper top wall and positioned within the upper top cavity of the top housing and that traverses a bottom side of the upper top housing. The top portion can further include a top coupling feature disposed on the upper top housing. The bottom portion can include a bottom housing having a bottom aperture and a bottom wall defining a bottom cavity. The bottom portion can also include a number of fuse holders positioned within the bottom cavity and aligned with the conductor receivers, where each of the fuse holders includes a top end and a bottom end, where the top end traverses a top side of the bottom housing. The bottom portion can further include a number of fuses removeably coupled to the fuse holders. The bottom portion can also include a collector positioned within the bottom aperture and electrically coupled to the bottom end of the fuses. The bottom portion can further include a connector pin positioned outside the bottom cavity and electrically coupled to the collector. The bottom portion can also include a bottom coupling feature disposed on the bottom housing, where the bottom coupling feature complements the top coupling feature. The conductor receivers can electrically couple to the top end of the fuses when the top portion is in a closed position relative to the bottom portion.

In another aspect, the disclosure can generally relate to a photovoltaic (PV) solar electric system. The PV solar electric system can include a number of PV solar panels comprising a plurality of conductors. The PV solar electric system can also include a main circuit and a squid connector. The squid connector can include a top portion and a bottom portion detachably coupled to the top portion. The top portion of the squid connector can include a top housing having a top aperture and a top wall defining a top cavity. The top portion of the squid connector can also include a number of conductor receivers coupled to the conductors and positioned within the top cavity of the top housing, where the conductor receivers traverse a bottom side of the top housing. The top portion of the squid connector can further include a top coupling feature disposed on the top housing. The bottom portion of the squid connector can include a bottom housing having a bottom aperture and a bottom wall defining a bottom cavity. The bottom portion of the squid connector can also include a collector positioned within the bottom cavity and electrically coupled to the bottom end of the plurality of conductor receivers. The bottom portion of the squid connector can further include a connector pin positioned within the bottom cavity and electrically coupled to the collector and the main circuit. The bottom portion of the squid connector can also include a bottom coupling feature disposed on the bottom housing, where the bottom coupling feature complements the top coupling feature.

These and other aspects, objects, features, and embodiments will be apparent from the following description and the appended claims.

BRIEF DESCRIPTION OF THE DRAWINGS

The drawings illustrate only exemplary embodiments and are therefore not to be considered limiting in scope, as the exemplary embodiments may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
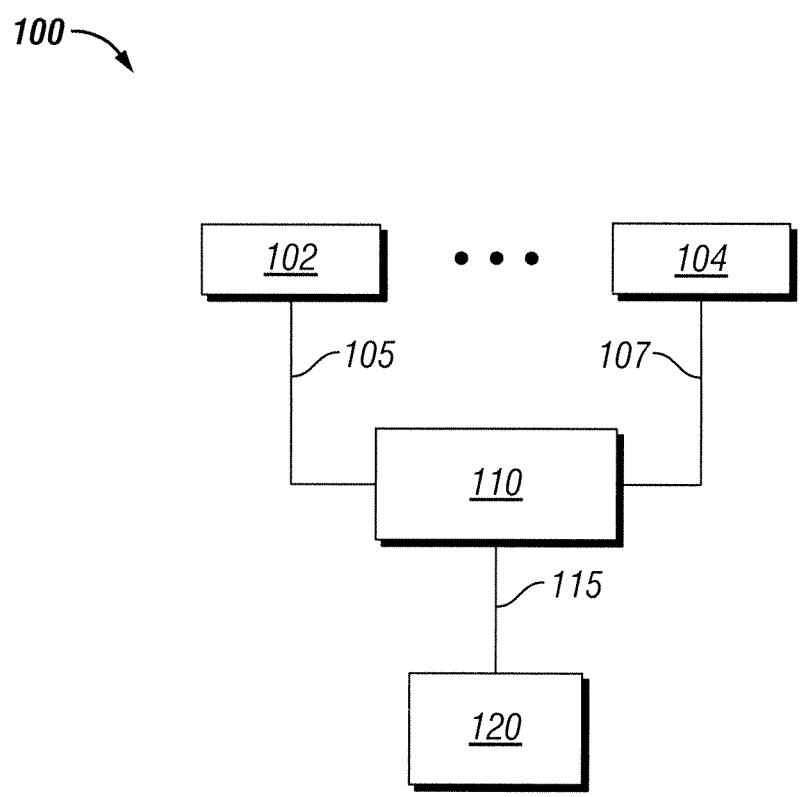
FIG. 1 shows a system drawing of a portion of an electrical circuit in which certain exemplary embodiments may be implemented.

Exemplary embodiments of squid connectors will now be described in detail with reference to the accompanying figures. Like, but not necessarily the same or identical, elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description. Further, certain descriptions (e.g., top, bottom, side, end, interior, inside, inner, outer) are merely intended to help clarify aspects and are not meant to limit embodiments described herein.

In general, exemplary embodiments provide systems, methods, and devices for squid connectors. Specifically, exemplary embodiments provide for receiving a number of conductors and integrating the signals received from each conductor within a connector. As used herein, a squid connector is an exemplary term used to describe a connector having a top portion and a bottom portion. The top portion receives multiple conductors, while the bottom portion provides a single (or, if multiple, fewer in number than the multiple conductors received by the top portion) connecting pin. In other words, the connector has the general appearance of a squid.

Further, while the exemplary embodiments discussed herein are described with reference to a PV solar system, one or more of a number of other electrical systems may be used in conjunction with exemplary embodiments. Examples of such systems include, but are not limited to, generation control systems and branch circuit management and protection.

With regard to a PV solar system, the exemplary squid connector can be used to replace a PV array circuit combiner. In other words, the squid connector replaces one or more junction boxes, one or more terminal blocks, conduit, complicated wiring, and other features used in conjunction with a PV array circuit combiner. Further, in certain exemplary embodiments, the squid connector can be used to replace one or more circuits ancillary to the PV array circuit combiner. For example, the squid connector can replace a fused switch.

A user may be any person that interacts with the squid connector. Examples of a user may include, but are not limited to, an engineer, an electrician, an instrumentation and controls technician, a mechanic, an operator, a consultant, a contractor, and a manufacturer's representative.

In certain exemplary embodiments, a squid connector is subject to meeting certain standards and/or requirements. For example, the National Electric Code (NEC) and the Institute of Electrical and Electronics Engineers (IEEE) set standards as to wiring and electrical connections. For example, Underwriters' Laboratories (UL) classifies fuse holders in a number of classes (e.g., Class J, Class T) where each class is defined by a number of categories, including but not limited to fuse characteristics (e.g., time delay, fast acting), interrupting rating (10,000 A, 200,000 A), and available ampere ratings (e.g., 1-1200, ¼-30). Use of exemplary embodiments described herein meet (and/or allow a corresponding device to meet) such standards when required. In PV solar applications, additional standards may need to be met by the exemplary squid connector.

FIG. 1 depicts a system 100 of a portion of an electrical circuit in which certain exemplary embodiments may be implemented. The system 100 includes a number of devices (e.g., device 1 102, device N 104), a number of conductors (e.g., conductor 1 105, conductor N 107), a squid connector 110, a conductor 115, and a main circuit 120. In one or more embodiments, one or more of the components shown in FIG. 1 may be omitted, repeated, and/or substituted. Accordingly, embodiments of squid connectors should not be considered limited to the specific arrangements of components shown in FIG. 1.

The multiple devices (e.g., device 1 102, device N 104) are electrically coupled to the squid connector 110 and provide electrical signals to the squid connector 110. The electrical signals can be voltages and/or currents, discrete and/or continuous, alternating current (AC) and/or direct current (DC), and provide for power and/or control. The electrical signals can flow from one or more of the multiple devices to the squid connector and/or in the opposite direction. The multiple devices can have one or more of a number of applications. For example, the multiple devices can be PV solar panels. Other examples of the multiple devices can include, but are not limited to, monitoring devices for a steam boiler, vibration monitors for an electric generator, and monitoring devices for an arc furnace.

In certain exemplary embodiments, the multiple devices are electrically coupled to the squid connector 110 using a conductor (e.g., conductor 1 105, conductor N 107). Each conductor can be a single conductor or one of a number of conductors within a cable. The conductor can be one of a number of sizes, such as 22 American wire gauge (AWG) or #18. One conductor can be the same (e.g., size, material) or different than the other conductors.

Further, when a conductor is used to electrically couple a device to the squid connector 110, a hardwire connection is made to one or more of the connector receivers within the squid connector 110. One or more of a number of connecting devices may be used to create the hardwire connection. Examples of such connecting devices may include, but are not limited to, a spade connection, a pin connection, soldering, a compression fitting, and a terminal block.

Other types of wires, cables, and/or wireless technology may be used in conjunction with a conductor to couple the squid connector 110 to each device. In addition, the squid connector 110 can be communicably coupled to a user (not shown) and/or a user system (also not shown) using one or more of any type of cable and/or wireless technology, including but not limited to a conductor.

In certain embodiments, the squid connector 110 is electrically coupled to all of the devices using the conductors. In addition, the squid connector 110 is electrically coupled to the main circuit 120. The squid connector 110 receives signals from the devices, integrates the signals into a single signal, and sends the single signal to the main circuit 120. Further detail about the squid connector 110 is described below with respect to FIGS. 2 and 3.

In certain exemplary embodiments, the conductor 115 is used to electrically couple the squid connector 110 to the main circuit 120. The conductor 115 can be a single conductor or one of a number of conductors within a cable. The conductor 115 can be one of a number of sizes. The conductor 115 can be the same (e.g., size, material) or different than the conductors that electrically couple the devices to the squid connector 110.

Further, when the conductor 115 is used to electrically couple the squid connector 110 to the main circuit 120, a hardwire connection is made to one or more of the connector pins of the squid connector 110. One or more of a number of connecting devices may be used to create the hardwire connection. Examples of such connecting devices may include, but are not limited to, a pin receiver, a spade connection, soldering, a compression fitting, and a terminal block.

Other types of wires, cables, and/or wireless technology may be used in conjunction with the conductor 115 to couple the squid connector 110 to the main circuit 120. In addition, the main circuit 120 may be communicably coupled to a user (not shown) and/or a user system (also not shown) using one or more of any type of cable and/or wireless technology, including but not limited to the conductor 115.

In certain exemplary embodiments, the main circuit 120 is electrically coupled to the squid connector 110. The main circuit 120 can be part of a central circuit for a system. The main circuit 120 can serve one or more of a number of functions. Examples of functions that the main circuit 120 can serve include, but are not limited to, an inverter, a converter, a transformer, a controller, and a protection circuit. The main circuit 120 can be one or more discrete components (e.g., resistor, capacitor), an integrated circuit, a programmable logic controller, some other suitable device, or any combination thereof. The main circuit 120 can operate based on hardware, firmware, and/or software.

The single signal, generated by the squid connector 110 using the signals received from the devices, can be used by the main circuit 120 for one or more of a number of purposes, including but not limited to inversion, conversion, control, and circuit protection. For example, in a PV solar system, the main circuit 120 would invert the single signal received from the squid connector 115.

Figure 2:
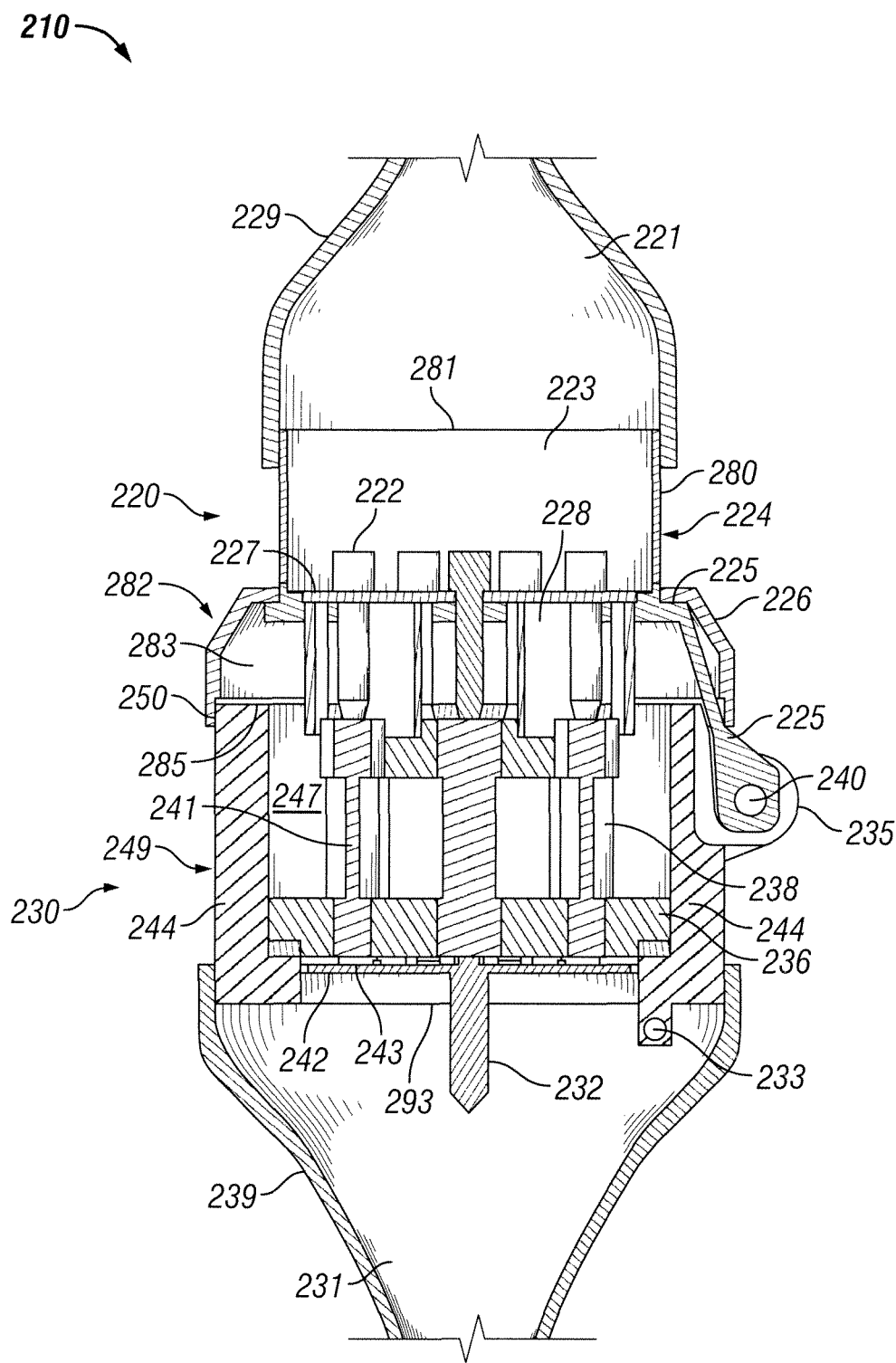
FIG. 2 shows a cross-sectional side view of a squid connector in accordance with certain exemplary embodiments.

FIG. 2 shows a cross-sectional side view of a squid connector 210 in accordance with certain exemplary embodiments. In one or more embodiments, one or more of the components shown in FIG. 2 may be omitted, repeated, and/or substituted. Accordingly, embodiments of squid connectors should not be considered limited to the specific arrangements of components shown in FIG. 2.

Referring now to FIGS. 1 and 2, the squid connector of FIG. 2 includes a top portion 220 and a bottom portion 230. In certain exemplary embodiments, the top portion 220 includes an upper top housing 224, an optional lower top housing 282, a number of conductor receivers 222, a coupling feature 225, an optional framework 227, optional electrically insulating barriers 228, and one or more cord grips 229, 239. The top portion 220 and the bottom portion 230 can be in a closed position (i.e., the top portion 220 and the bottom portion 230 of the squid connector are fully assembled) with respect to each other or in an open position (i.e., the top portion 220 and the bottom portion 230 are at least partially separated from each other). As described below, the top portion 220 and the bottom portion 230 can be coupled to each other (e.g., hingedly coupled) while being in an open position with respect to each other.

The upper top housing 224 of the top portion 220 includes an upper top wall 280 along its perimeter and an aperture 281 at the top end of the upper top housing 224. The upper top wall 280 of the upper top housing 224 defines an upper top cavity 223 inside the upper top wall 280. The upper top wall 280 of the upper top housing 224 can be any shape, thickness, and/or height. In this example, the upper top wall 280 of the upper top housing 224 is circular, having substantially the same radius along its height.

In certain exemplary embodiments, the cord grip 229 mechanically couples to the outer surface of the upper top wall 280 of the upper top housing 224. The cord grip 229 provides a liquid-proof, durable, and flexible casing around the one or more conductors positioned on the inside 221 of the cord grip 229. Such one or more conductors electrically couple the devices (e.g., device 1 102, device N 104) to the squid connector 110. The cord grip 229 can be made of one or more of a number of materials, including but not limited to rubber, nylon, plastic, and metal. In certain exemplary embodiments, the cord grip 229 is fixedly coupled to the outer surface of the upper top wall 280 of the upper top housing 224. In such a case, one or more of a number of methods can be used, including but not limited to epoxy, heat shrink tubing, compression fittings, mating threads, and fastening devices. The cord grip 229 can also be coupled to the outer surface of the upper top wall 280 of the upper top housing 224 in one or more other ways, including but not limited to slidably, removably, rotatably, and hingedly.

In certain exemplary embodiments, the upper top housing 224 is mechanically coupled to the optional lower top housing 282. The lower top housing 282 can include a lower top wall 226 along its perimeter and an aperture 285 at the lower end of the lower top housing 282. The lower top wall 226 of the lower top housing 282 defines a lower top cavity 283 inside the lower top wall 226. The lower top wall 226 of the lower top housing 282 can be any shape, thickness, and/or height. In this example, the lower top wall 226 of the lower top housing 282 is circular, having substantially the same radius along its height for the lower half and a gradually decreasing radius along its upper half moving toward the top end of the lower top housing 282. At any point along its height, the radius of the lower top housing 282 can be greater than the radius of the upper top housing 224. In such a case, the lower top housing 282 has a larger perimeter than the upper top housing 224.

The lower top housing 282 can be mechanically coupled to the upper top housing 224 in one or more of a number of ways, including but not limited to fixedly, slidably, removably, rotatably, and hingedly. In such a case, one or more of a number of methods can be used, including but not limited to epoxy, heat shrink tubing, compression fittings, mating threads, and fastening devices. In certain exemplary embodiments, when the lower top housing 282 is mechanically coupled to the upper top housing 224, a liquid-tight seal is formed, preventing liquids from entering the lower top cavity 283 and/or the upper top cavity 223.

Along the bottom end of the upper top housing 224 and/or the upper end of the lower top housing 282, within the upper top cavity 223, are positioned a number of conductor receivers 222. Specifically, the conductor receivers 222 are mechanically coupled to the upper top wall 280 of the upper top housing 224 and/or to the lower top wall 226 of the lower top housing 282. In certain exemplary embodiments, the conductor receivers 222 are mechanically coupled to the upper top wall 280 of the upper top housing 224 and/or to the lower top wall 226 of the lower top housing 282 using a framework 227 that is also coupled to the conductor receivers 222. For example, the framework 227 can have a lattice structure where the conductor receivers 222 traverse holes in the lattice. The framework 227 can be fixedly or removably coupled to the upper top wall 280 of the upper top housing 224, to the lower top wall 226 of the lower top housing 282, and/or to the conductor receivers 222. The framework 227 may be made of any of a number of materials, including but not limited to metal, plastic, and nylon. The framework 227 can be electrically non-conductive.

In addition, or in the alternative, a number of electrically insulating barriers 228 may be disposed between the conductors and/or the conductor receivers 222 within the upper top cavity 223 and/or the lower top cavity 283 of the top portion 220. The barriers 228 can be used to dissipate heat generated by the conductors and/or the conductor receivers 222. The barriers 228 can also be used to prevent arcing (and thus a short circuit and other adverse electrical conditions) between two or more of the conductors and/or the conductor receivers 222. In certain exemplary embodiments, the barriers 228 are mechanically coupled to the framework, if any. Alternatively, or in addition, the barriers 228 are mechanically coupled to the upper top wall 280 of the upper top housing 224, to the lower top wall 226 of the lower top housing 282, and/or to the conductor receivers 222.

The electrically insulating barriers 228 can be made of one or more of a number of thermally conductive material and/or electrically non-conductive material, including but not limited to plastic, nylon, and rubber. The electrically insulating barriers 228 can be made of any size and/or shape suitable to provide a physical barrier between two or more conductors and/or conductor receivers 222. In addition, or in the alternative, the electrically insulating barriers 228 can provide a physical barrier between the upper top wall 280 of the upper top housing 224, the lower top wall 226 of the lower top housing 282, one or more conductors, and/or one or more conductor receivers 222.

In certain exemplary embodiments, as shown in FIG. 2, the barriers 228 extend downward further away from the framework 227 when compared to the conductor receivers 222. In such a case, the barriers 228 provide a safety feature when the squid connector 210 is in the open position. Specifically, if the squid connector 210 is opened when one or more of the devices (e.g., device 1 102, device N 104) is still electrically energized, then the risk of electric shock to a user is reduced or eliminated because the barriers 228, by extending beyond the length of the conductor receivers 222, protect against contact with the conductor receivers 222. In this way, a user can quickly and safely replace a fuse 238 without going to a different location to operate a disconnect switch or some similar protective device.

In certain exemplary embodiments, the conductor receivers 222 are made of an electrically conductive material, including but not limited to copper and aluminum. The conductor receivers 222 can also be made, at least in part, of an electrically nonconductive material, including but not limited to plastic, nylon, and rubber. Each of the conductor receivers 222 can have the same shape, height, and/or other dimensions as the rest of the conductor receivers 222. The number of conductor receivers 222 are at least as great as the number of conductors (e.g., conductor 1 105, conductor N 107) electrically coupled to the devices (e.g., device 1 102, device N 104). The conductor receivers 222 are positioned within the upper top housing 224 and/or the lower top housing 282.

The top end of each conductor receiver 222 is configured to receive and maintain an electrical and mechanical coupling with an end portion of a conductor. Such a configuration can have one or more of a number of forms. For example, the top end of a conductor receiver 222 can be tubular for receiving a corresponding pin connector of the conductor. As another example, the top end of the conductor receiver 222 can be a pin connector for being inserted into a corresponding tubular connector of the conductor. When the conductor is mated with the corresponding conductor receiver 222, the two components are mechanically coupled. The mechanical coupling of the conductor and the conductor receiver 222 can be removably coupled, slidably coupled, fixedly coupled, and/or coupled in some other fashion.

In certain exemplary embodiments, the conductor receiver 222 has an electrically conductive material that contacts a portion of the conductor when the conductor is mechanically coupled to the conductor receiver 222. The conductive material, and/or some other conductive material that is mechanically coupled to the conductive material, forms the bottom end of the conductor receiver 222. In certain exemplary embodiments, the bottom end of the conductor receivers 222 traverse a bottom side of the upper top housing 220 and/or the lower top housing 282.

When the top portion 220 is in a closed position with respect to the bottom portion 230, the bottom end of the conductor receivers 222 contact with the top end of the optional fuses 238, electrically coupling the conductor receivers 222 to the fuses 238. Conversely, when the top portion 220 is in an open position with respect to the bottom portion 230, the bottom end of the conductor receivers 222 lose contact with the top end of the fuses 238, electrically decoupling the conductor receivers 222 from the fuses 238. In cases where there are no fuse holders 236 (and thus no fuses 238), the bottom end of the conductor receivers 222 become electrically coupled and decoupled to the collector receivers 243.

In certain exemplary embodiments, the fuse holders 236 are positioned within the bottom cavity 247 of the bottom portion 230. The bottom portion 230 has a bottom housing 249. The bottom housing 249 of the bottom portion 230 includes a bottom wall 244 along its perimeter and an aperture 293 at the bottom end of the bottom housing 249. The bottom wall 244 of the bottom housing 249 defines the bottom cavity 247 inside the bottom wall 244. The bottom wall 244 of the bottom housing 249 can be any shape, thickness, and/or height. In this example, the bottom wall 244 of the bottom housing 249 is circular, having substantially the same radius along its height. In certain exemplary embodiments, bottom wall 244 of the bottom portion 230 is thermally conductive and is mechanically coupled to the fuse holders 236.

The fuse holders 236 have a top end and a bottom end that are shaped (e.g., a clip) and sized to receive one or more fuses 238. The fuse holders 236 can be made from one or more of a number of materials, including metal (e.g., copper, alloy, aluminum, stainless steel), plastic, nylon, some other material, or any combination thereof. The ends of the fuse holders 236 may have some degree of physical flexibility to allow an end of the fuse 238 to be held under compression and/or tension and also to be removed by applying a certain amount of force to remove the end of the fuse 238 from the fuse holder 236. The fuse holders 236 can also have an intermediate portion 241 that mechanically couples to the ends of the fuse holder 236. The intermediate portion 241 can be made of the same or a different material than the material used for the ends of the fuse holders 236.

The fuses 238 that mechanically couple to the fuse holders 236 can have one or more shapes, current ratings, sizes, and/or other characteristics. In certain exemplary embodiments, an end portion of the fuses 238 are made of an electrically conductive material that contacts a bottom portion of the conductor receiver 222 when the top portion 220 is in a closed position with respect to the bottom portion 230. In certain exemplary embodiments, more than one conductor receiver 222 is electrically coupled to a single fuse 238. Under normal electric operating conditions, the fuses 238 allow power (e.g., voltage, current) to flow through them, from one end of the fuse 238 to the other end. When the current and/or voltage become too high (based, in part, on the rating and size of the fuse 238), an element inside the fuse 238 breaks down, creating an open circuit between the ends of the fuse 238. In such a case, the fuse 238 is often replaced to reconnect the circuit through the fuse 238 because the element inside the fuse 238 is not replaceable or repairable. In this case, in order to replace a fuse 238, the top portion 220 is in an open position with respect to the bottom portion 230 to access the fuse 238.

The bottom end of the fuse holder 236 is positioned within the bottom cavity 247 in such a way as to allow the bottom end of the fuses 238 to contact the collector 242 or, more specifically in some cases, the optional collector receivers 243. In certain exemplary embodiments, the collector receivers 243 are electrically coupled to the collector 242 and positioned to electrically couple to the bottom end of the fuses 238. The collector receivers 243 are made of an electrically conductive material, which may be the same or different electrically conductive material as the ends of the fuses 238, the conductor receivers 222, and/or the conductors. The collector receivers 243 may be protrusions that extend upward from the collector 242 toward the fuses 238. The collector receivers 243 can be of any suitable size (e.g., thickness, height) and/or shape suitable to provide adequate electrical contact with the end of the fuses 238 and to conduct voltage and/or current between the fuses 238 and the collector 242.

In cases where there are no fuse holders 236 (and, thus, no fuses 238), the conductor receivers 222 are electrically and mechanically coupled to the collector receivers 243 when the top portion 220 is in a closed position with respect to the bottom portion 230. Conversely, when the top portion 220 is in an open position with respect to the bottom portion 230, the conductor receivers 222 are not electrically and mechanically coupled to the collector receivers 243. The collector receivers 243 are positioned within the bottom cavity 247 in certain exemplary embodiments. In certain exemplary embodiments, more than one conductor receiver 222 is electrically coupled to a single collector receiver 243.

The collector 242 is electrically coupled to the collector receivers 243 on the top side and to a connector pin 232 on the bottom side. As such, the collector 242 receives the electrical signals (e.g., voltage, current) from each of the conductors (through the conductor receivers 222 and, optionally, the fuses 238) and integrates the numerous electrical signals into a single signal. In certain exemplary embodiments, the collector 242 is made of an electrically conductive material, which may be the same or different electrically conductive material as the ends of the fuses 238, the conductor receivers 222, the collector receivers 243, and/or the conductors. The collector 242 may have one or more of a number of shapes and/or configurations. For example, the collector 242 may be a solid plate. As another example, the collector 242 may be a series of overlapping strips that are fixedly coupled to each other. The collector 242 may be positioned at or near the bottom aperture 293 of the bottom housing 249.

The collector pin 232 extends downward from the collector 242, away from the bottom portion 230. The collector pin 232 is electrically and mechanically coupled to the collector 242. In certain exemplary embodiments, the collector pin 232 is positioned outside the bottom cavity 247. In such a case, the collector pin 232 can be positioned on the inside 231 of the cord grip 239. The collector pin 232 can be made of an electrically conductive material, which may be the same or different electrically conductive material as the ends of the fuses 238, the conductor receivers 222, the collector receivers 243, the collector 242, and/or the conductors. The collector pin 232 may have one or more of a number of shapes and/or configurations. For example, the collector pin 232 may have a length, thickness, and shape to securely mechanically couple to a female receiver at one end of the conductor 115 and provide the single signal generated by the collector 242 to the main circuit 120. As another example, the collector pin 232 can be a lug or some other receiver that receives (couples to) a conductor, connector, or other electrically conductive feature.

In certain exemplary embodiments, the cord grip 239 mechanically couples to the outer surface of the bottom wall 244 of the bottom housing 249. The cord grip 239 provides a liquid-proof, durable, and flexible casing around the conductor 115 positioned on the inside 231 of the cord grip 239. The conductor 115 electrically couples the squid connector 210 to the main circuit 120. The cord grip 239 can be made of one or more of a number of materials, including but not limited to rubber, nylon, plastic, and metal. The material of the cord grip 239 can be the same or different material as that of the cord grip 229. In certain exemplary embodiments, the cord grip 239 is fixedly coupled to the outer surface of the bottom wall 244 of the bottom housing 249. In such a case, one or more of a number of methods can be used, including but not limited to epoxy, heat shrink tubing, compression fittings, mating threads, and fastening devices. The cord grip 239 can also be coupled to the outer surface of the bottom wall 244 of the bottom housing 249 in one or more other ways, including but not limited to slidably, removably, rotatably, and hingedly.

In certain exemplary embodiments, bottom wall 244 is electrically and mechanically connected to a ground circuit 233. The ground circuit 233 can be any type of ground circuit, including but not limited to a system ground, an Earth ground, and a floating ground. A portion of the bottom wall 244 that mechanically couples to the ground circuit 233 may extend beyond the bottom aperture 293 to the inside 231 of the cord grip 239. In such a case, the ground circuit 233 may also be mechanically and electrically coupled to a ground wire that runs on the inside 231 of the cord grip 239 along with the conductor 115.

As mentioned above, the top portion 220 and the bottom portion 230 have an open position and a closed position with respect to each other. When in a closed position, which is needed during electric operation of the system 100, the top portion 220 and the bottom portion 230 are mechanically coupled to create a liquid-tight seal that prevents liquid from entering the upper top cavity 223 (as well as the lower top cavity 283, if applicable) and the bottom cavity 247. When in an open position, which occurs when electric operation of the system 100 is interrupted or to interrupt electric operation of the system 100, the top portion 220 and the bottom portion 230 are either completely decoupled (as when the top portion 220 and the bottom portion 230 are in a closed position using mating threads) or partially coupled (as when the top portion 220 and the bottom portion 230 are coupled using a hinged connection). As used herein, the term detachably coupled is used to describe the coupling between the top portion 220 and the bottom portion 230.

In certain exemplary embodiments, the top portion 220 and the bottom portion 230 are detachably coupled using one or more coupling features. In such a case, each of the top portion 220 and/or the bottom portion 230 may have its own coupling feature that complement each other to secure the top portion 220 and the bottom portion 230 in the closed position. As an example, the top portion 220 and the bottom portion 230 may have complementary mating threads to create a threaded coupling when the top portion 220 and the bottom portion 230 are in the closed position. As another example, as shown in FIG. 2, the top portion 220 can have a hinge joint 225, and the bottom portion 230 can have a complementary hinge joint 235. In such a case, a fastening device (such as pin 240) can be used to hingedly couple the top portion 220 to the bottom portion 230.

In certain exemplary embodiments, one or more additional components and/or features are used to provide a seal when the top portion 220 is in the closed position relative to the bottom portion 230. Examples of such additional components include, but are not limited to, a gasket, an o-ring, epoxy, Teflon tape, a latch, and a clamp. Examples of additional features include, but are not limited to, a channel along the bottom perimeter of the upper top housing 224, a channel along the bottom perimeter of the lower top housing 282, a channel along the top perimeter of the bottom housing 249, and one or more friction fit protrusions. As a specific example, when the top portion 220 and the bottom portion 230 are hingedly coupled, as shown in FIG. 2, one or more friction fit protrusions 250 may be disposed on the bottom of the upper top cavity 223 (or the lower top cavity 283, if applicable) and the top of the bottom cavity 247, opposite where the hinge joints 225, 235 are located. In such a case, the friction fit protrusions 250 can maintain the top portion 220 and the bottom portion 230 in a closed position relative to each other.

Figure 3:
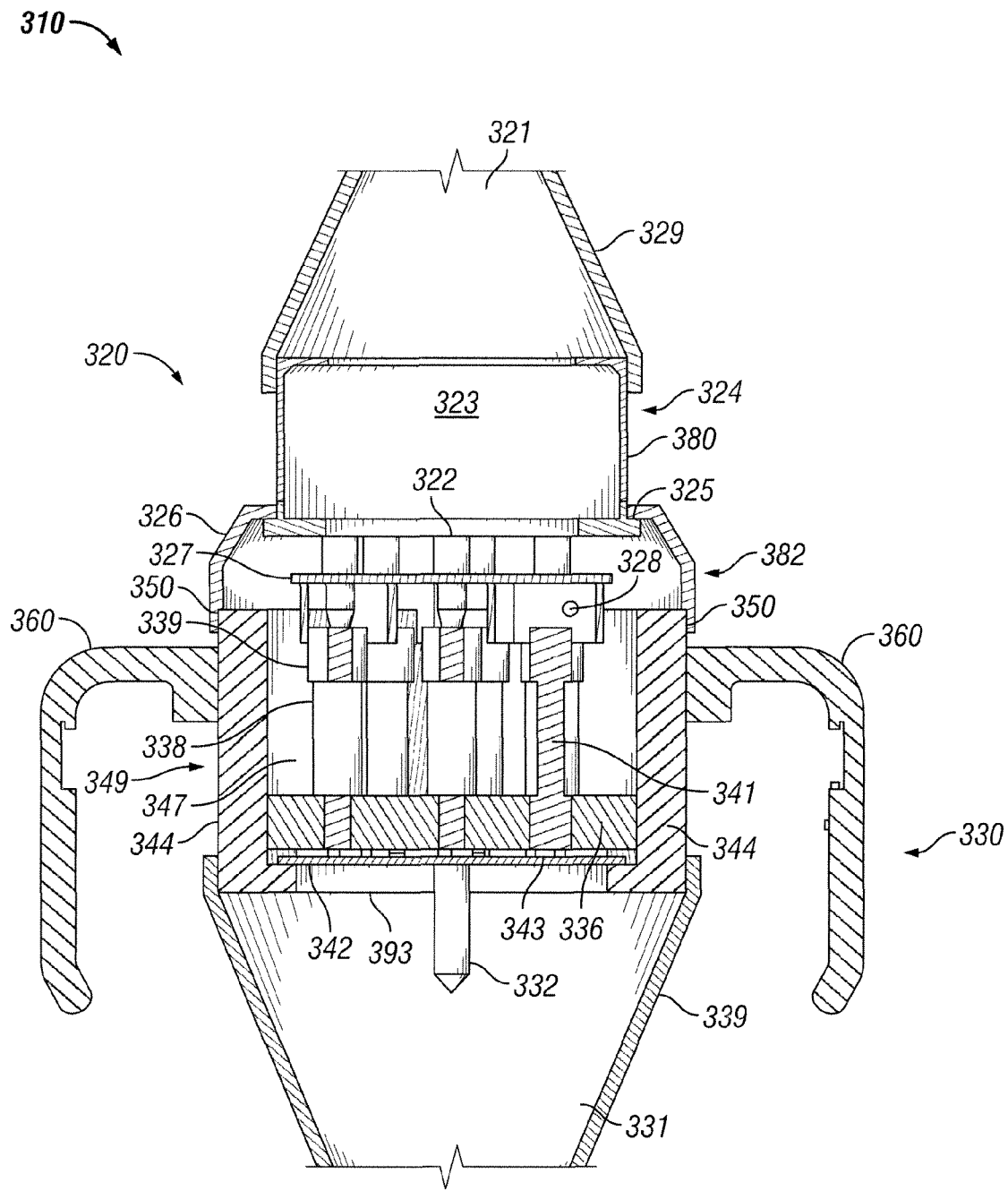
FIG. 3 shows a cross-sectional side view of an alternative squid connector in accordance with certain exemplary embodiments.

FIG. 3 shows a cross-sectional side view of an alternative squid connector 310 in accordance with certain exemplary embodiments. Except as described below, the components of the squid connector 310 are substantially similar to the corresponding components described above with respect to FIGS. 1 and 2.

Referring to FIGS. 1-3, the lower top housing 382 in FIG. 3 is not fixedly coupled to the upper top housing 324, as the lower top housing 282 in FIG. 2 is to the upper top housing 224. Rather, the lower top housing 382 is freely rotatable with respect to the upper top housing 324. In this respect, the lower top housing 382 can be a rotatable mating collar that rotates independently of the upper top housing 324. The lower top housing 382 can be removably coupled to the upper top housing 324 or fixedly coupled (while still being able to freely rotate independently of the upper top housing 324). In either case, a liquid-tight seal is formed between the lower top housing 382 and the upper top housing 324. In certain exemplary embodiments, a gasket 325 and/or some other sealing component can be inserted between the lower top housing 382 and the upper top housing 324 to maintain a liquid-tight seal.

In addition, the inside surface of the lower top housing 382 can have mating threads that complement mating threads disposed on the outer surface at the top of the bottom housing 349. In this way, the lower top housing 382 can be threadably and rotatably coupled to the bottom housing 349. By rotating the lower top housing 382 in one direction, the upper top housing 324 (via the lower top housing 324) can be in a closed position with respect to the bottom housing 349. Alternatively, by rotating the lower top housing 382 in the other direction, the upper top housing 324 (via the lower top housing 324) can be detached from the bottom housing 349, creating an open position between the upper top housing 324 and the bottom housing 349.

An addition to the squid connector 310 of FIG. 3 compared to the squid connector 210 of FIG. 2 is one or more handles 360 that are mechanically coupled to the outer surface of the bottom wall 344 of the bottom housing 349. In addition, or in the alternative, the handle (or a portion thereof) can be mechanically coupled to the outer surface of the upper top wall 324 and/or the lower top wall 326 of the top portion 320. If the handles 360 are mechanically coupled to both the bottom portion 330 and the top portion 320, then the handles may have one or more features (e.g., slotted fittings) that allow the bottom portion 330 and the top portion 320 to align a certain way in the closed position when the portions of the handle 360 are mechanically coupled.

The handles 360 can be made of one or more of a number of suitable materials, including but not limited to plastic, rubber, and metal. The handles 360 can be coupled to the bottom portion 330 and/or the top portion 320 using one or more coupling methods, including but not limited to fastening devices (e.g., bolts, screws), epoxy, welding, compression fittings, and slotted fittings. The mechanical coupling of the handles 360 to the bottom portion 330 and/or the top portion 320 can be one or more of a number of different types of coupling, including but not limited to slidably coupled, fixedly coupled, rotatably coupled, and hingedly coupled.

The handles 360 can have a number of different characteristics (e.g., thickness, shape, length). Each handle 360 can be rigid or flexible. In certain exemplary embodiments, the handles 360 are strong enough to sustain the entire weight of the squid connector 310 as well as some amount of conductor (e.g., conductor 1 105, conductor N 107, conductor 115) that mechanically couples to both sides of the squid connector 310. The handles 360 can have one or more of a number of features (e.g., notches and slots disposed on the inner surface of the handles 360, as shown in FIG. 3) that can allow the squid connector 310 to mechanically couple to one or more features of an electrical system 100. Further, the handles 360 can provide strain relief on the conductors mechanically coupled to the squid connector 310, as well as the squid connector 310 itself.

Figure 4:
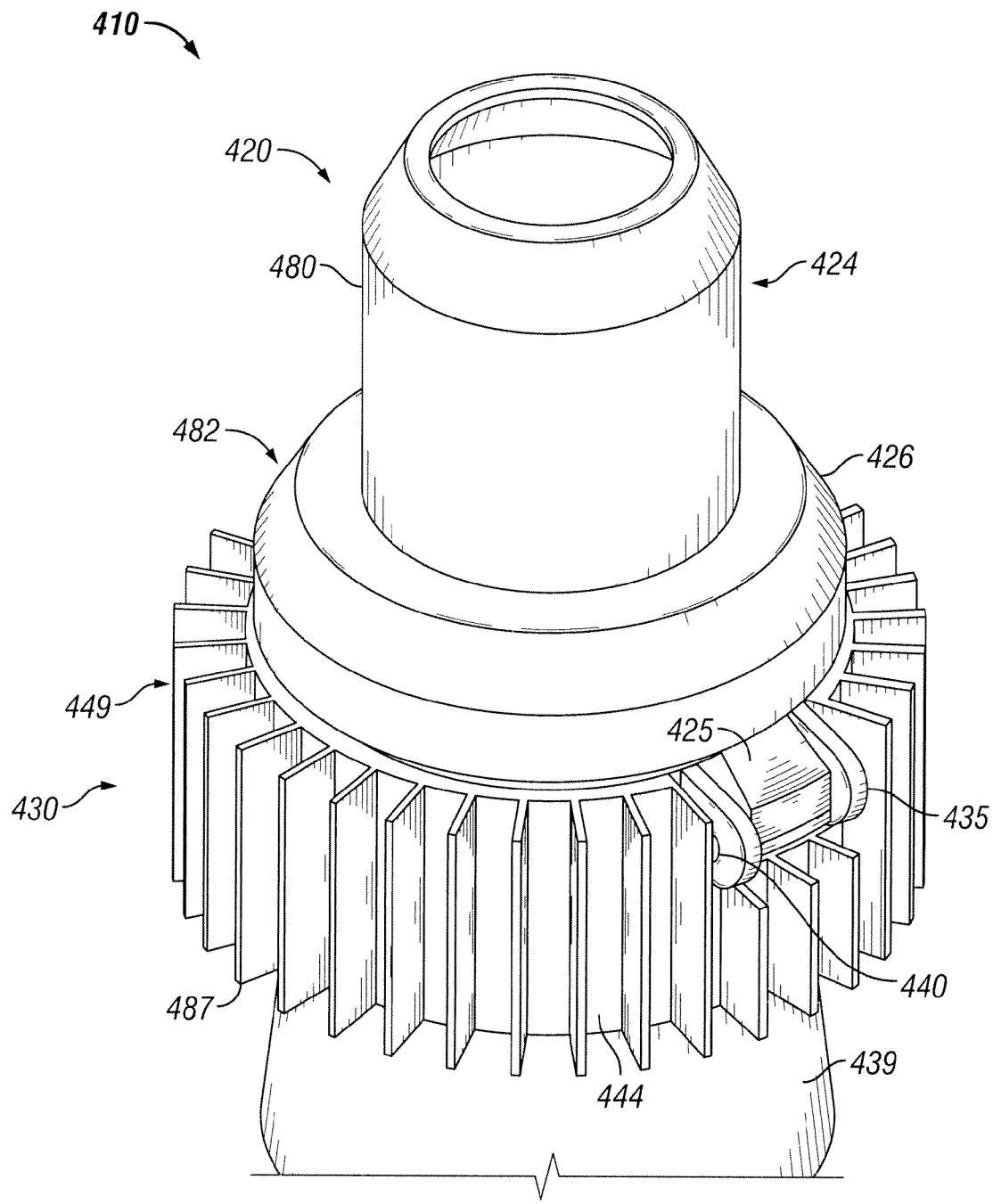
FIG. 4 shows a perspective view of another alternative connector in accordance with certain exemplary embodiments.

FIG. 4 shows a perspective view of another alternative squid connector 410 in accordance with certain exemplary embodiments. Except as described below, the components of the squid connector 410 are substantially similar to the corresponding components described above with respect to FIGS. 1 and 2.

Referring to FIGS. 1, 2, and 4, the upper top housing 424 of the upper portion 420 in FIG. 4 is tapered inward toward the top end. The cord grip 429 is omitted from FIG. 4 to show this tapered feature. The top end of the upper top housing 424 may be tapered in such a way for one of a number of reasons, including but not limited to providing a more secure mechanical coupling to the cord grip 429.

In addition, the bottom housing 449 of the bottom portion 430 has a number of protrusions 487 that extend outward from the outer surface of the bottom wall 444. The protrusions 487 and the bottom housing 449 may form a single piece (e.g., single molding). Alternatively, one or more of the protrusions 487 may be separate components that are mechanically coupled to the outer surface of the bottom housing 449. In such a case, the one or more protrusions 487 may be mechanically coupled to the bottom housing 449 using one or more of a number of methods, including but not limited to epoxy, welding/soldering, slotted fittings, and fastening devices. The protrusions 487 and the bottom housing 449 may be coupled together in one or more of a number of ways, including fixedly coupled, slidably coupled, and detachably coupled.

The protrusions 487, like the bottom wall 444, may be made from one or more of a number of thermally conductive materials, including but not limited to metal and ceramic. The protrusions 487 of the bottom housing 449 can be any shape, thickness, and/or height. In this example, the protrusions 487 of the bottom housing 449 are radially extending rectangular fins that are equally spaced around the outer surface of the bottom wall 444. A number of the protrusions 487 in line with the hinge assembly 425, 435 have a shorter height so as not to interfere with the hinged movement of the top portion 420 relative to the bottom portion 430. In certain embodiments, the protrusions 487 functionally perform as heat sink fins to improve dissipation of the heat generated by the fuses (not shown in FIG. 4) inside the squid connector 410.

Exemplary embodiments provide for a squid connector. Specifically, certain exemplary embodiments allow for the connection of a number of conductors in a central location. In addition, exemplary embodiments integrate the signal delivered by the multiple conductors within the squid connector. The squid connector can be assembled and disassembled without the use of (or with limited use of) tools. Further, exemplary embodiments provide a user with a visual indication that the squid connector is secured in the closed position. Exemplary embodiments may be used with a variety of sizes, quantities, and/or shapes of conductor.

In addition, exemplary embodiments provide circuit protection to the corresponding electric circuit. Specifically, fuses are integrated with the exemplary squid connector to prevent an overcurrent and/or overvoltage situation. Further, exemplary embodiments allow a user to interchange the squid connector between an open position and a closed position. In the open position, the user can easily and safely change one or more fuses. When the exemplary squid connector is in the open position, the electrical circuit is opened, which makes removal of the fuses safe.

Further, exemplary embodiments save time, material, and money in installing and maintaining an electrical system.

Specifically, using exemplary squid connectors described herein reduces or eliminates the need for junction boxes, conduit, terminal blocks, fuse blocks, conductors, and a number of other components. In addition, the use of exemplary squid connectors can provide one or more of a number of electrical and/or mechanical benefits relative to the conductor. Such benefits can include, but are not limited to, strain relief, ease of installation, ease of maintenance, timeliness of replacing a blown fuse that results from an overcurrent and/or overtemperature condition, and visual confirmation of connectivity of the squid connector.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the exemplary embodiments is not limited herein.

What is claimed is:

1. A squid connector, comprising:
    a top portion comprising:
        an upper top housing comprising a top aperture and an upper top wall defining an upper top cavity;
        a plurality of conductor receivers mechanically coupled to an inner surface of the upper top wall and positioned within the upper top cavity of the upper top housing and that traverses a bottom side of the upper top housing; and
        a top coupling feature disposed on the upper top housing; and
    a bottom portion detachably coupled to the top portion, the bottom portion comprising:
        a bottom housing comprising a bottom aperture and a bottom wall defining a bottom cavity;
        a plurality of fuse holders positioned within the bottom cavity and aligned with the plurality of conductor receivers, wherein each of the plurality of fuse holders comprises a top end and a bottom end, wherein the top end traverses a top side of the bottom housing;
        a plurality of fuses removeably coupled to the plurality of fuse holders;
        a collector positioned within the bottom aperture and electrically coupled to the bottom end of the plurality of fuses;
        a connector pin positioned outside the bottom cavity and electrically coupled to the collector; and
        a bottom coupling feature disposed on the bottom housing, wherein the bottom coupling feature complements the top coupling feature,
    wherein the plurality of conductor receivers electrically couple to the top end of the plurality of fuses when the top portion is in a closed position relative to the bottom portion.

2. The squid connector of claim 1, further comprising:
    a first cord grip that mechanically couples to the upper top wall of the upper top housing.

3. The squid connector of claim 1, further comprising:
    a handle that mechanically couples to an outer surface of the bottom wall of the bottom housing.

4. The squid connector of claim 1, wherein the connector pin is directed away from the bottom aperture in the bottom portion.

5. The squid connector of claim 1, wherein the top coupling feature and the bottom coupling feature are complementary hinge joints that are mechanically coupled using a pin, wherein the top portion is hingedly coupled to the bottom portion.

6. The squid connector of claim 5, further comprising:
    a securing mechanism disposed on the lower top housing and the bottom housing.

7. The squid connector of claim 1, wherein the top coupling feature and the bottom coupling feature are complementary mating threads, wherein the lower top housing is threadably coupled to the bottom housing.

8. The squid connector of claim 1, wherein the top coupling feature is a rotatable mating collar that threadably couples to complementary mating threads of the bottom coupling feature, wherein the mating collar rotates independently of the top portion.

9. The squid connector of claim 1, wherein the top portion further comprises:
    a plurality of electrically insulating barriers disposed between the plurality of conductor receivers.

10. The squid connector of claim 1, wherein the bottom wall of the bottom portion is thermally conductive and is mechanically coupled to the plurality of fuse holders.

11. The squid connector of claim 10, wherein the bottom wall is electrically coupled to a ground circuit.

12. The squid connector of claim 10, further comprising a plurality of protrusions mechanically coupled to an outer surface of the bottom wall and extending radially outward from the bottom wall, wherein the plurality of protrusions is thermally conductive.

13. The squid connector of claim 1, wherein the fuses are accessible at the top end of the bottom housing when the top portion is in an open position relative to the bottom portion.

14. The squid connector of claim 1, wherein the bottom portion and the top portion create a liquid-tight seal that prevents liquid from entering the upper top cavity and the bottom cavity when the top portion is in the closed position with respect to the bottom portion.

15. The squid connector of claim 1, wherein the top portion further comprises:
    a lower top housing fixedly coupled to the upper top housing and comprising a lower top wall that defines a lower top cavity, wherein the lower top wall has a larger perimeter than the upper top wall.

16. The squid connector of claim 15, further comprising a framework mechanically coupled to the upper top wall, wherein the framework comprises a lattice structure that mechanically couples to the plurality of conductor receivers.

17. The squid connector of claim 1, wherein the collector comprises a plurality of collector receivers electrically coupled to the collector and positioned to electrically couple to the bottom end of the plurality of fuses.

18. A photovoltaic (PV) solar electric system, comprising:
    a plurality of PV solar panels comprising a plurality of conductors;
    a main circuit; and
    a squid connector comprising:
        a top portion comprising:
            a top housing comprising a top aperture and a top wall defining a top cavity;
            a plurality of conductor receivers coupled to the plurality of conductors and positioned within the top cavity of the top housing, wherein the plurality of conductor receivers traverses a bottom side of the top housing; and a top coupling feature disposed on the top housing; and a bottom portion detachably coupled to the top portion, the bottom portion comprising:

a bottom housing comprising a bottom aperture and a bottom wall defining a bottom cavity;

a collector positioned within the bottom cavity and electrically coupled to the bottom end of the plurality of conductor receivers;

a connector pin positioned within the bottom cavity and electrically coupled to the collector and the main circuit; and a bottom coupling feature disposed on the bottom housing, wherein the bottom coupling feature complements the top coupling feature.

19. The PV solar electric system of claim 18, wherein the bottom portion further comprises:

a plurality of fuse holders positioned within the bottom cavity to align with the plurality of conductor receivers, wherein each of the plurality of fuse holders comprise a top end and a bottom end, wherein the top end traverses a top side of the bottom housing and electrically couple to the bottom end of the plurality of conductor receivers; and a plurality of fuses mechanically coupled to the plurality of fuse holders, wherein the fuses are accessible at the top end of the bottom housing, wherein the plurality of conductor receivers electrically couples to the top end of the plurality of fuses when the top portion is in a closed position relative to the bottom portion.

20. The PV solar electric system of claim 18, wherein the top wall comprises an upper top wall comprising a first perimeter and a lower top wall comprising a second perimeter, wherein the second perimeter is greater than the first perimeter.

\* \* \* \* \*